United States Patent
An et al.

(10) Patent No.: US 9,355,455 B2
(45) Date of Patent: May 31, 2016

(54) IMAGE DATA PROCESSING METHOD AND STEREOSCOPIC IMAGE DISPLAY USING THE SAME

(71) Applicant: LG DISPLAY CO., LTD., Seoul (KR)

(72) Inventors: Cheunghwan An, Seoul (KR); Myungsoo Park, Seoul (KR); Kyungah Chin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 195 days.

(21) Appl. No.: 13/708,286

(22) Filed: Dec. 7, 2012

(65) Prior Publication Data

US 2014/0035902 A1 Feb. 6, 2014

(30) Foreign Application Priority Data

Jul. 31, 2012 (KR) .................. 10-2012-0083844

(51) Int. Cl.
| | |
|---|---|
| *G06K 9/00* | (2006.01) |
| *H04N 13/04* | (2006.01) |
| *G06T 7/00* | (2006.01) |
| *H04N 13/00* | (2006.01) |

(52) U.S. Cl.
CPC .......... *G06T 7/0079* (2013.01); *H04N 13/0022* (2013.01); *H04N 13/0033* (2013.01); *H04N 13/0404* (2013.01); *H04N 13/0409* (2013.01); *H04N 13/0434* (2013.01); *H04N 13/0438* (2013.01)

(58) Field of Classification Search
CPC ... G06T 7/0075; G06T 19/00; H04N 13/0497
USPC .............................. 345/419; 348/51; 382/154
See application file for complete search history.

(56) References Cited

U.S. PATENT DOCUMENTS

| | | | |
|---|---|---|---|
| 2007/0086675 A1* | 4/2007 | Chinen et al. ................. 382/284 |
| 2008/0043262 A1* | 2/2008 | Ovsiannikov ........ H04N 1/4072 |
| | | | 358/1.9 |
| 2010/0080448 A1* | 4/2010 | Tam et al. ..................... 382/154 |
| 2011/0109620 A1* | 5/2011 | Hong et al. ..................... 345/419 |
| 2011/0261160 A1* | 10/2011 | Tadokoro et al. ............... 348/46 |

(Continued)

FOREIGN PATENT DOCUMENTS

| | | |
|---|---|---|
| CN | 101682794 A | 3/2010 |
| CN | 102457755 A | 5/2012 |
| KR | 20110014067 A | 2/2011 |

(Continued)

OTHER PUBLICATIONS

Office Action issued in corresponding Korean Patent Application No. 10-2012-0083844, mailed May 16, 2014, 5 pages.

(Continued)

*Primary Examiner* — Phi Hoang
*Assistant Examiner* — Yi Yang
(74) *Attorney, Agent, or Firm* — Brinks Gilson & Lione

(57) ABSTRACT

An image data processing method comprises: extracting a depth map from an input image; separating the input image into a foreground area and a background area based on grayscales of the depth map; and modulating the maximum depth value of the input image to become smaller and the difference between depth values of a gray grayscale segment of the depth map to be greater than the difference between depth values of the foreground area and background area of the input image.

14 Claims, 16 Drawing Sheets

(56) References Cited

U.S. PATENT DOCUMENTS

2013/0071009 A1* 3/2013 Ha .................................. 382/154
2013/0162762 A1* 6/2013 Cohen ............................. 348/42

FOREIGN PATENT DOCUMENTS

| KR | 20110052207 A | 5/2011 |
|----|---------------|--------|
| TW | 200818883 A   | 4/2008 |
| TW | 201208344 A   | 2/2012 |

OTHER PUBLICATIONS

Office Action issued in Taiwanese Patent Application No. 101149210, mailed Feb. 10, 2015, 13 pages.
De Silva et al., "3D Video Assessment with Just Noticeable Difference in Depth Evaluation" Proceedings of 2010 IEEE $17^{th}$ International Conference on Image Processing, Hong Kong, Sep. 26-29, 2010, 6 pages.
Office Action dated Aug. 7, 2015 for corresponding Chinese Patent Application No. 201210558722.X, 13 pages.

* cited by examiner (a)          (b)

IMAGE DATA PROCESSING METHOD AND STEREOSCOPIC IMAGE DISPLAY USING THE SAME

This application claims the benefit of Korean Patent Application No. 10-2012-0083844 filed on Jul. 31, 2012, which is incorporated herein by reference for all purposes as if fully set forth herein.

BACKGROUND

1. Field of the Disclosure

This disclosure relates to an image data processing method and a stereoscopic image display using the same.

2. Discussion of the Related Art

As the stereoscopic image reproduction technology is applied to display devices, such as a television or a monitor, now is the age in which people can view 3D stereoscopic images even at home. A stereoscopic image display may be divided into a glasses type and a non-glasses type. In the glasses type, left and right parallax images each having a different polarization direction are displayed on a direct-view display or projector, and a stereoscopic image is displayed using polarization glasses or liquid crystal shutter glasses. In the non-glasses type, optical parts, such as a parallax barrier and a lenticular lens, are installed in front of a display screen to separate optical axes of left and right parallax images.

Visual factors that allow a person to perceive stereoscopic effects, i.e., depth cues, may include physiological factors and empirical factors. The physiological factors include accommodation, convergence, binocular disparity, etc.

The empirical factors include monocular movement disparity, retinal image size, linear perspective, areal perspective, overlapping, contrast, texture gradient, etc. The empirical factors allow a person to feel a stereoscopic effect with a learned sense of perspective, such as a sense of perspective on the difference in size between objects, a sense of perspective on the overlap between objects, a sense of perspective on the difference in brightness between objects, and a sense of perspective on the difference in sharpness between objects. For example, a human brain, after learning a sense of perspective, perceives the larger object to be nearer when seeing a larger object and a smaller object, perceives a more forward object to be nearer when seeing two objects overlapping, and perceives the bright object to be nearer when seeing a bright object and a dark object at a time. Also, the human brain that has learned perspective perceives the clear object to be nearer when seeing a clear object and an unclear object.

When a viewer views a 3D stereoscopic image reproduced by a stereoscopic image display, the viewer may feel much fatigued or have nausea or headache, mainly due to physiological factors. These symptoms are because the position of the image of an object (or subject) the viewer sees is different from the focal distance.

When the viewer sees a subject, the eyes converge to a point, which is referred to as convergence. The convergence angle θ varies depending on how far the viewer's eyes are from the subject. As shown in FIG. 1, the convergence angle θ is an angle formed between the eyes and the subject when the viewer sees the subject. The farther the distance from the viewer's eyes to the subject, the smaller the convergence angle θ; when the viewer sees a subject at a very far distance, the convergence angle θ is close to 0°.

For an object the viewer perceives through the eyes in an actual situation, the convergence position coincides with the accommodation position, as shown in (a) of FIG. 1. Thus, the distance perceived by convergence and the distance perceived by accommodation are equal. Accordingly, the viewer may feel a stereoscopic effect without a sense of fatigue in an actual situation. In contrast, as shown in (b) of FIG. 1, when a left-eye image and a right-eye image separated by binocular disparity are displayed on a display panel PNL of a stereoscopic image display, the accommodation position is on the screen of the display panel PNL and the image of the object is positioned in front of or behind the screen of the display panel PNL in accordance with 3D input image depth information. As a result, the focal distance L1 of the eyes does not coincide with the distance L2 at which the image of the object is formed. Since the focal distance L1 of the eyes does not coincide with the distance L2 at which the image of the object is formed, the viewer viewing the stereoscopic image display feels fatigued. Especially, the viewer feels more fatigued when viewing a stereoscopic moving image displayed on the stereoscopic image display and when the convergence angle is large, because the difference between the distances L1 and L2 varies for each scene.

SUMMARY

An image data processing method comprises: extracting a depth map from an input image; separating the input image into a foreground area and a background area based on grayscales of the depth map; and modulating the maximum depth value of the input image to become smaller and the difference between depth values of a gray grayscale segment of the depth map to be greater than the difference of depth values between the foreground area and background area of the input image.

A stereoscopic image display comprises: a depth map extractor that extracts a depth map from an input image; an image separator that separates the input image into a foreground area and a background area based on grayscales of the depth map; and a depth modulator that modulates the maximum depth value of the input image to become smaller and the difference of depth values a gray grayscale segment of the depth map to be greater than the difference between depth values of the foreground area and background area of the input image.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Figure 1:
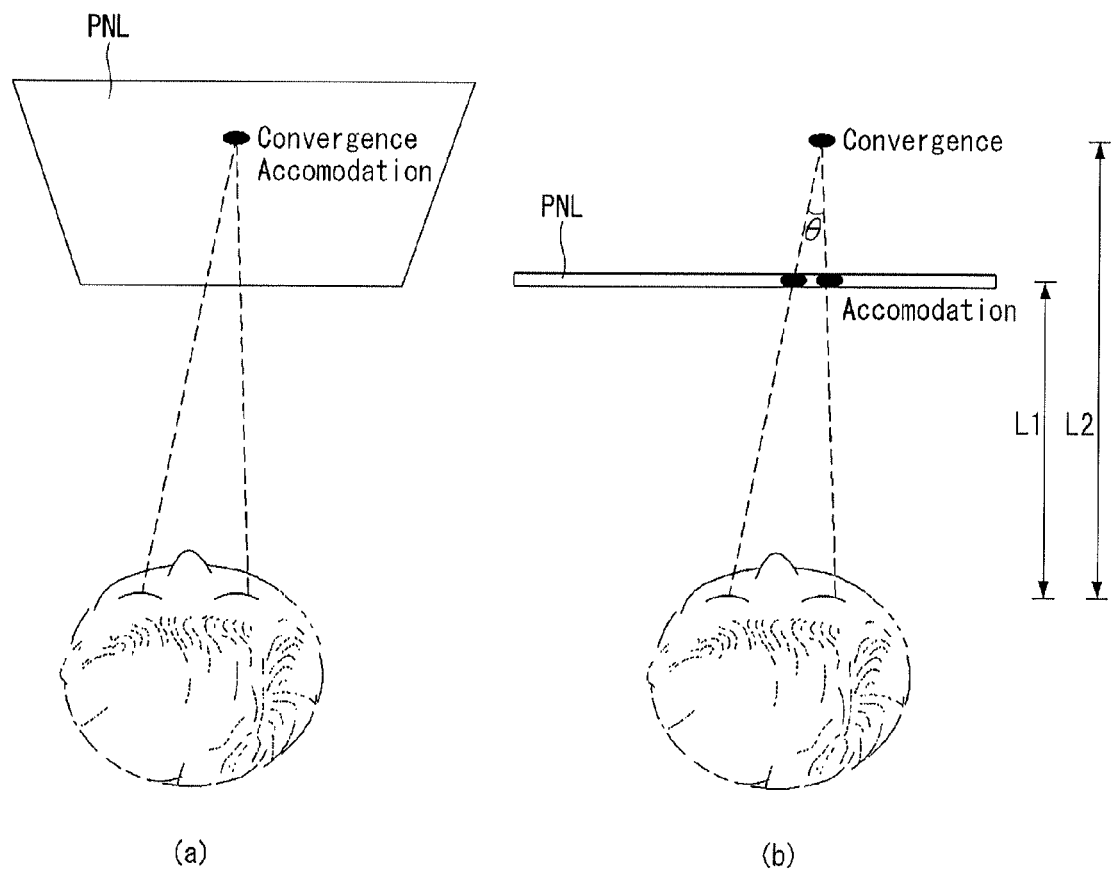
FIG. 1 is a view showing the cause of viewer fatigue in a stereoscopic image display.

Hereinafter, exemplary embodiments of the present invention will be described with reference to the drawings. Throughout the specification, like reference numerals denote substantially like components. In the following description, if it is decided that the detailed description of known function or configuration related to the invention makes the subject matter of the invention unclear, the detailed description is omitted.

Before describing the embodiments of this invention, the terms used herein will be defined.

A stereoscopic image display of the present invention may be implemented as a flat panel display such as a liquid crystal display (LCD), a field emission display (FED), a plasma display panel (PDP), an organic light emitting diode (OLED), and an electrophoresis EPD. This stereoscopic image display may be implemented as a non-glasses type stereoscopic image display or a glasses type stereoscopic image display, and displays 2D image data in the 2D mode and 3D image data in the 3D mode. A 3D filter may be bonded onto a display panel of the stereoscopic image display. The glasses type stereoscopic image display may be implemented as a polarization glasses type or a shutter glasses type.

The 3D filter is an optical part that separates sub-pixels seen through the viewer's left eye and sub-pixels seen through the viewer's right eye. The 3D filter may be an optical part, such as a parallax barrier or a lenticular lens, in the non-glasses type stereoscopic image display, or a patterned retarder or active retarder in the glasses type stereoscopic image display. The parallax barrier and the lenticular lens may be implemented as a switchable barrier and switchable lens, respectively, which are electrically controlled by using a liquid crystal panel. A switchable barrier and a switchable lens are proposed in U.S. patent application Ser. No. 13/077, 565 and U.S. patent application Ser. No. 13/325,272, etc. by the present applicant.

A region of interest (ROI) is also known as an object of interest or saliency (OOI), which is an object, on a screen of a stereoscopic image, in which the viewer is most interested.

A depth map is extracted by 3D image data analysis. Any depth map extraction algorithm may be used as long as it is well-known. In the depth map, a depth value of data of each pixel of a 3D image is represented by a grayscale. The depth value can be modulated by changing the grayscale in the depth map. In the present invention, 1 screen (or scene) is separated into a foreground area and a background area for each frame period based on grayscales of the depth map. Depth values of the foreground area are grayscales which belong mainly to a white grayscale portion in the depth map. The depth values of the white grayscale portion comprise a white grayscale, which is the maximum grayscale value, and bright grayscales near the white grayscale. Depth values of the background area are grayscales which belong mainly to a black grayscale portion in the depth map. The black grayscale portion comprises a black grayscale, which is the lowest grayscale value, and dark grayscales near the black grayscale. The region of interest belongs mainly to the foreground area. In the depth map, a gray grayscale portion comprises depth values of the image which consist of grayscale values between the white grayscale portion and the black grayscale portion. The gray grayscale portion corresponds to depth values between the foreground area and the background area.

The white grayscale portion, the black grayscale portion, and the gray grayscale portion may be experimentally determined depending on the panel characteristics and driving characteristics of the display device. The slope, length, etc. of the white grayscale portion, the black grayscale portion, and the gray grayscale portion may be fixed to values optimized based on the result of a fatigue test of a 3D image, which differs according to the model of the display device. Also, they may be varied according to the program genre, properties, or average brightness of the 3D image. For example, the slope, length, etc of the white grayscale portion, the black grayscale portion, and the gray grayscale portion may differ according to program genres such as news, sports, movies, comics, etc, and the white grayscale portion, the black grayscale portion, and the gray grayscale portion may be set to different lengths in a still image or moving image.

Figure 2:
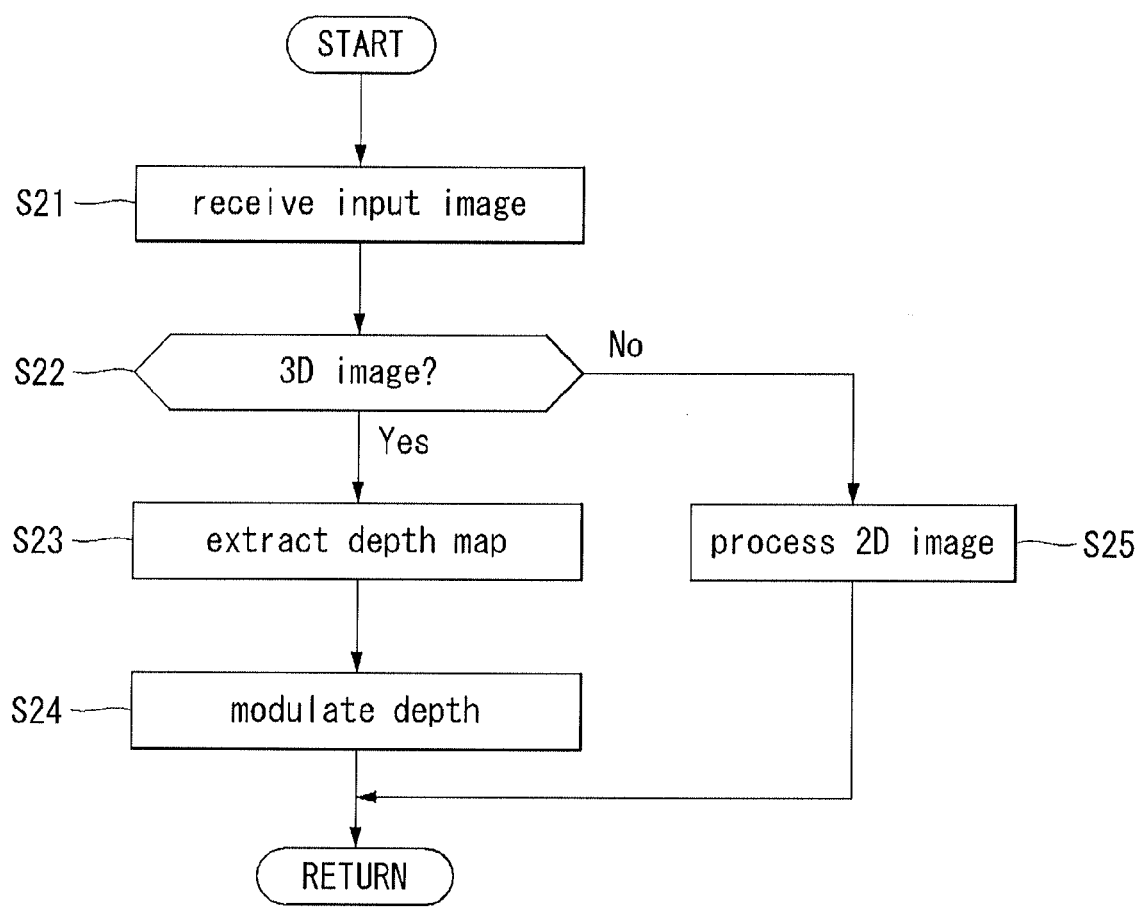
FIG. 2 is a flowchart showing an image data processing method of a stereoscopic image display according to a first exemplary embodiment of the present invention.

FIG. 2 is a flowchart showing an image data processing method of a stereoscopic image display according to a first exemplary embodiment of the present invention.

Referring to FIG. 2, in the image data processing method of the present invention, when 3D image data is received, an original depth map is extracted from the 3D image data by using a well-known depth extraction algorithm (S21 to S23). In the present invention, a well-known 2D-3D conversion algorithm may be used to convert a 2D image into a 3D image and extract a depth map from the 3D image.

Next, in the image data processing method of the present invention, depth values of the original depth map are modulated by using a depth modulation method shown in FIGS. 7a to 7e. In the depth modulation method of the present invention, based on a depth modulation curve shown in FIGS. 7a to 7e, the maximum depth value of the original depth map is decreased to a value less than an input value, and the difference of depth values between the foreground area and the background area is increased (S24). In FIGS. 7a to 7e, the adjustment width, slope, range of grayscale portions, etc of the maximum depth value may differ according to the model of the display model or according to 3D images.

The depth modulation curve shown in FIGS. 7a to 7e may be implemented by multiplying the depth values of the original depth map by a weighted value proportional to the slope of the curve, or implemented by a look-up table. When an input depth value of the original depth map is input into the look-up table, a modulation value (output depth value) corresponding to the input depth value is selected and output.

In the image data processing method of the present invention, an image input in the 2D mode is processed in the same way as in the prior art, and input into a display panel driver (S25).

In the present invention, the maximum depth value is modulated to become smaller by ΔD, as shown in FIGS. 7a to 7e, in order to make the display position of a 3D image and the focal position of the viewer similar to each other. It is possible to keep a sense of depth in the entire image by increasing the difference of depth values between the foreground area and the background area, i.e., the depth values of the gray grayscale portion GD.

Figure 3:
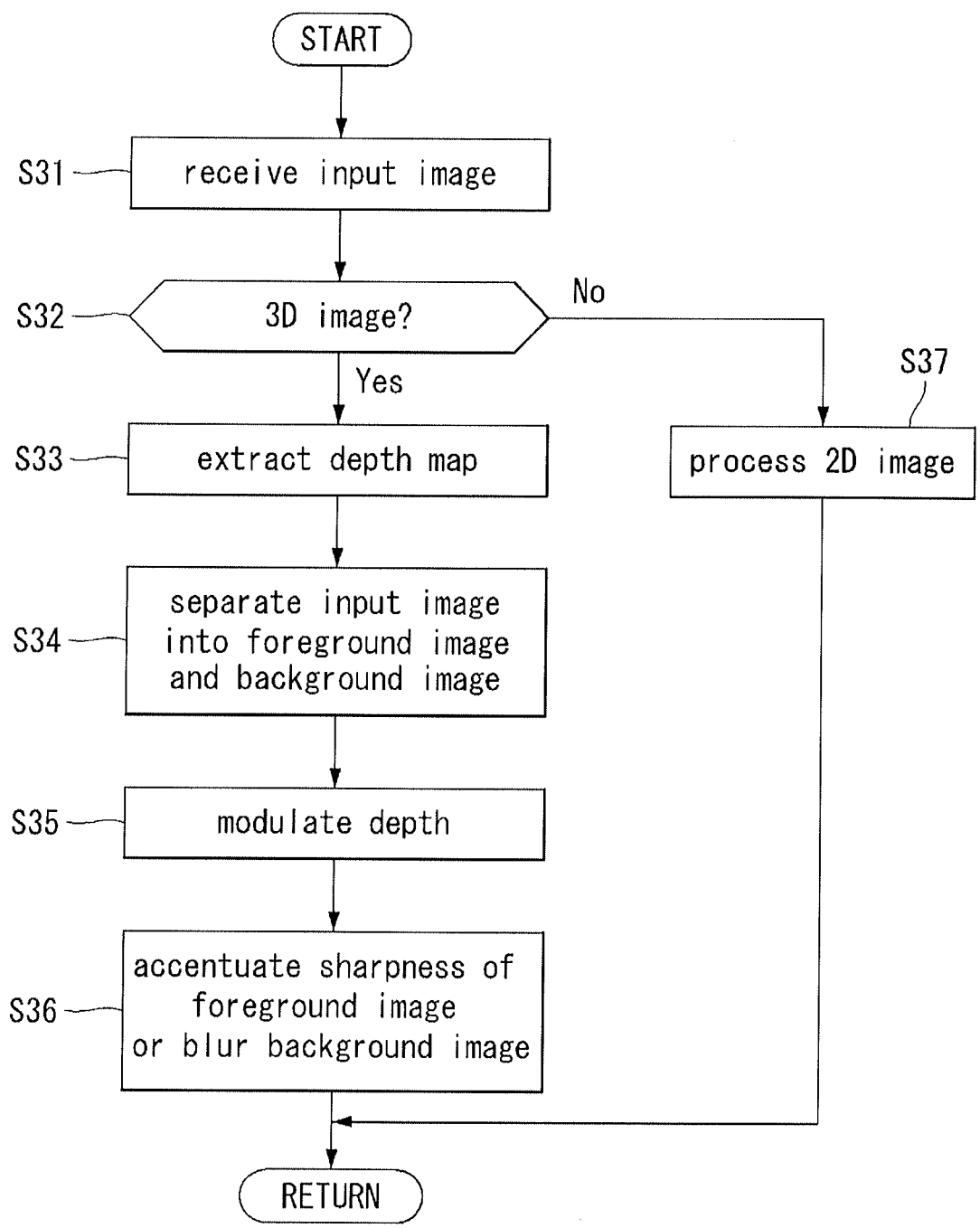
FIG. 3 is a flowchart showing an image data processing method of a stereoscopic image display according to a second exemplary embodiment of the present invention.

FIG. 3 is a flowchart showing an image data processing method of a stereoscopic image display according to a second exemplary embodiment of the present invention.

Referring to FIG. 3, in the image data processing method of the present invention, when 3D image data is received, a depth map is extracted from the 3D image data (S31 to S33). In the present invention, a well-known 2D-3D conversion algorithm may be used to convert a 2D image into a 3D image and extract a depth map from the 3D image.

In the image data processing method of the present invention, the foreground and background areas are extracted based on grayscale values of the depth map (S34). Next, in the image data processing method of the present invention, the depth modulation method shown in FIGS. 7a to 7e is used to decrease the maximum depth value and increase the difference of depth values between the foreground area and the background area (S35). As a result, the image data processing method of the present invention can reduce viewer fatigue, without losing the depth effect for 3D images, when reproducing a 3D stereoscopic image on the stereoscopic image display.

Next, in the image data processing method of the present invention, the sharpness of pixel data of the foreground image is accentuated to increase the sharpness of the foreground image, or pixel data of the background image is blurred to decrease the sharpness of the background image (S36). By thusly increasing the sharpness of the foreground image or decreasing the sharpness of the background image, the viewer can feel a natural stereoscopic effect without fatigue because of sharpness difference. In the step S36, the image data processing method of the present invention can increase the sharpness of the foreground image and decrease the sharpness of the background image. Any sharpness accentuation algorithm or blurring algorithm may be used as long as it is well-known.

In the image data processing method of the present invention, an image input in the 2D mode is processed in the same way as in the prior art, and input into a display panel driver (S37).

Figure 4:
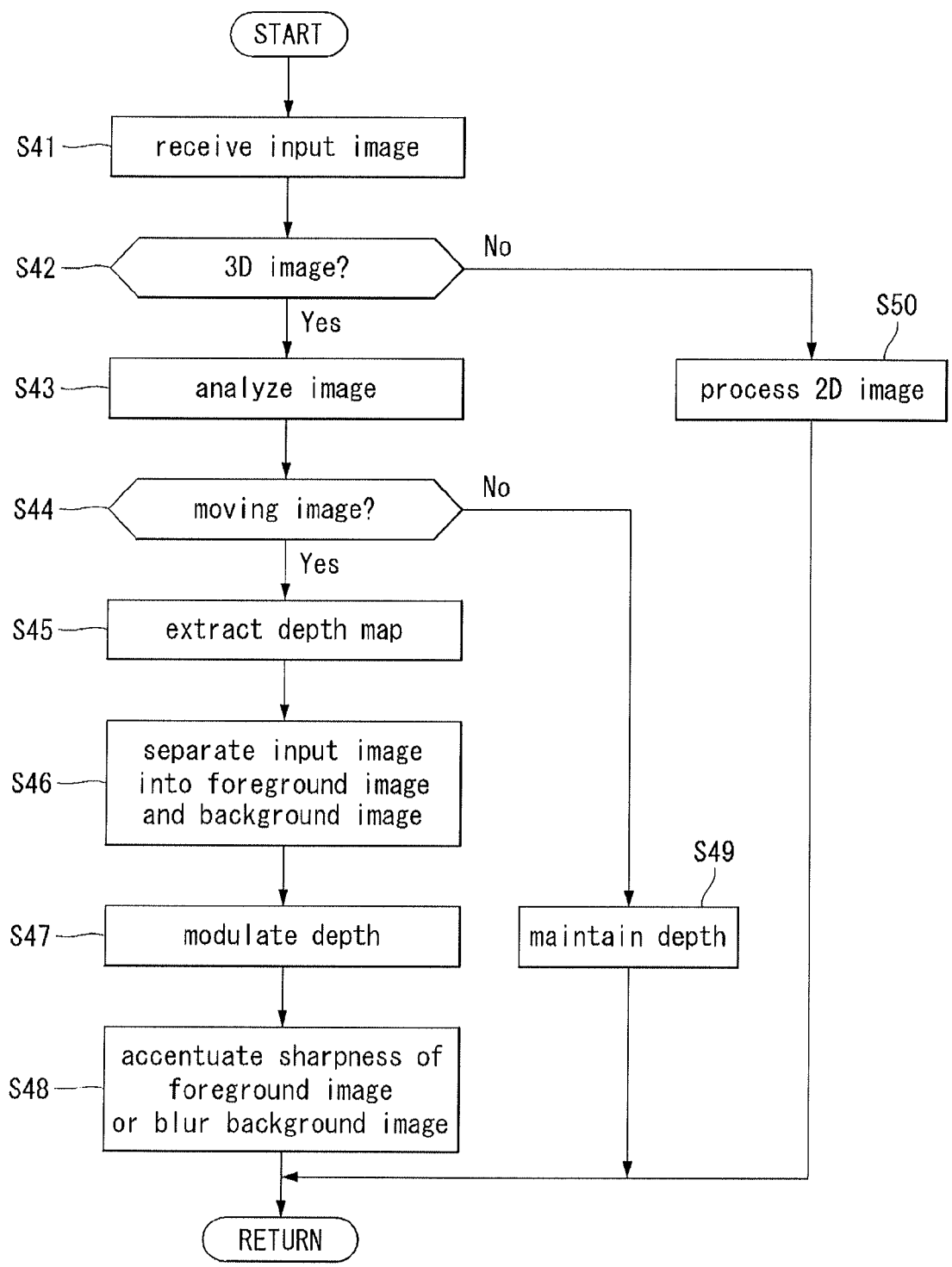
FIG. 4 is a flowchart showing an image data processing method of a stereoscopic image display according to a third exemplary embodiment of the present invention.

FIG. 4 is a flowchart showing an image data processing method of a stereoscopic image display according to a third exemplary embodiment of the present invention.

Referring to FIG. 4, in the image data processing method of the present invention, a 3D image is analyzed to determine whether the 3D image is a moving image or still image (S41 to S44). Any image analysis method may be used as long as it is well-known. For example, in the image data processing method of the present invention, a comparison of pixel data of frames is made to detect movement of the 3D image based on the difference, or a motion vector is calculated to determined movement of the 3D image. Next, in the image data processing method of the present invention, if 3D image data is moving image data, a depth map is extracted from the 3D image data (S45).

In the image data processing method of the present invention, depth values are modulated in the same way as in the second exemplary embodiment, and then the sharpness of the foreground area is increased and the sharpness of the background area is decreased (S46 to S48). With this method, the viewer can feel a natural stereoscopic effect in the moving image by increasing the sharpness of the foreground image, where a region of interest is concentrated, or decreasing the sharpness of the background image.

When the viewer sees a still image, they will have a good look at images of the foreground and background area after seeing main objects in the region of interest (ROI). Hence, it is important to achieve balance in sharpness on the entire image in terms of the picture quality of the still image. Accordingly, in the image data processing method of the present invention, if a current input 3D image is detected as a still image in the step S44, depth information of the current input 3D image is maintained as input depth values (S49).

In the image data processing method of the present invention, an image input in the 2D mode is processed in the same way as in the prior art, and input into a display panel driver (S50).

Figure 5:
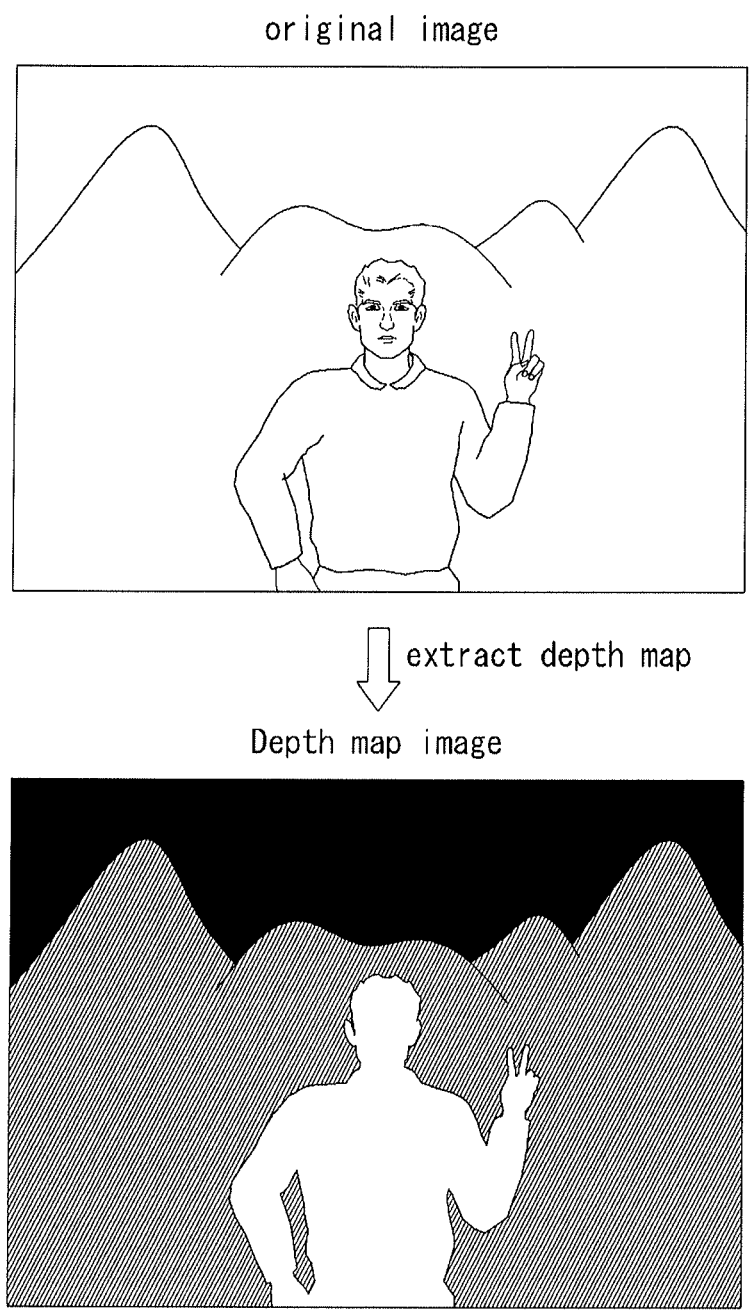
FIG. 5 is a view showing examples of a depth map extracted from a 3D input image.

FIG. 5 is a view showing examples of a depth map extracted from a 3D input image.

Referring to FIG. 5, once an original depth map is extracted from an original 3D image, depth values are represented by grayscales in the depth map. In the depth map, a white grayscale portion corresponds to the foreground area. A gray grayscale portion corresponds to the boundary between the foreground area and the background area. A black grayscale portion corresponds to a background area behind a region of interest.

Figure 6:
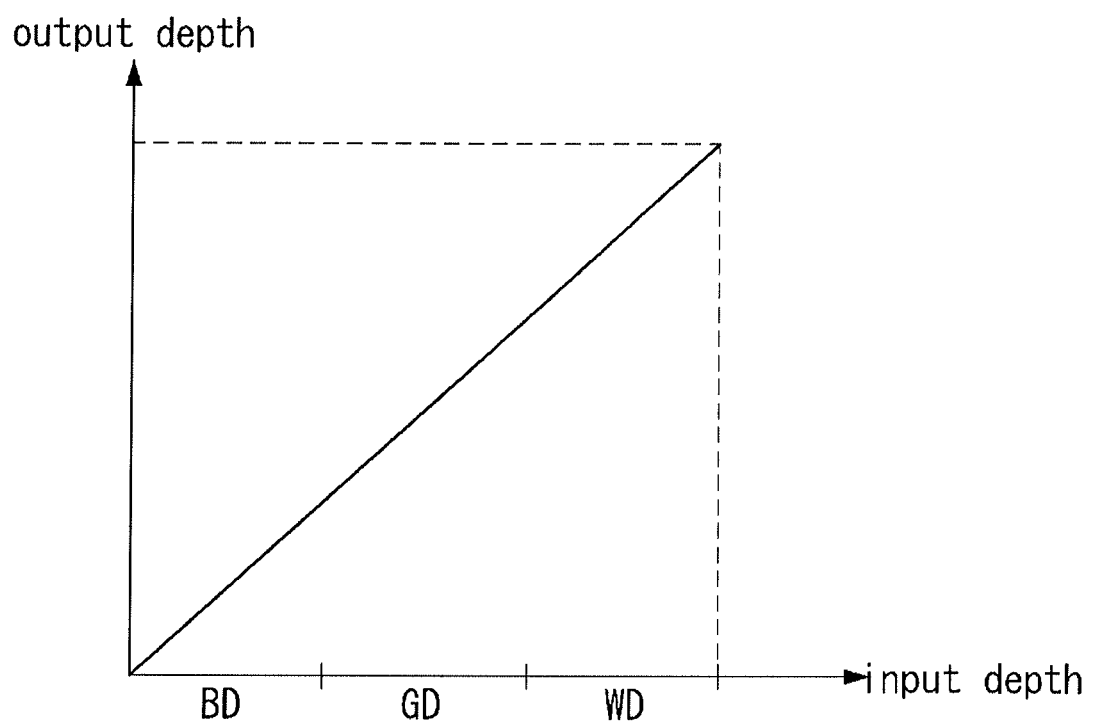
FIG. 6 is a view showing a typical linear depth processing method.

FIG. 6 is a view showing a typical linear depth processing method. FIGS. 7a to 7e are views showing a depth modulation method applied in an image data processing method of the present invention.

In general, unless the depth values of the original 3D image are modulated, input depth values and output depth values are as shown in FIG. 6. In contrast, in the present invention, the maximum depth value is modulated to be less than an input value based on the depth modulation curve shown in FIGS. 7a to 7e, and the display position of the 3D image and the focal position of the viewer are adjusted to be nearer to each other as show in FIG. 9. Also, in the present invention, the difference (or distance) of depth values between the foreground area and the background area is modulated to become larger, based on the depth modulation curve shown in FIGS. 7a to 7e, thereby increasing the depth effect in the foreground and background areas. Therefore, the present invention can reduce viewer fatigue without losing the depth effect for 3D images.

Figure 7A:
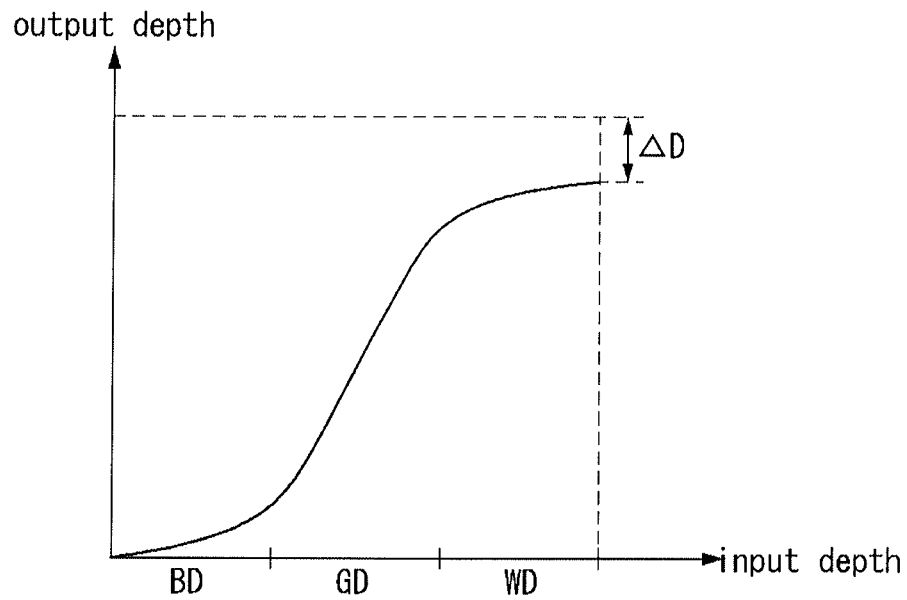
FIGS. 7a to 7e are views showing a depth modulation method applied in an image data processing method of the present invention.
Figure 7B:
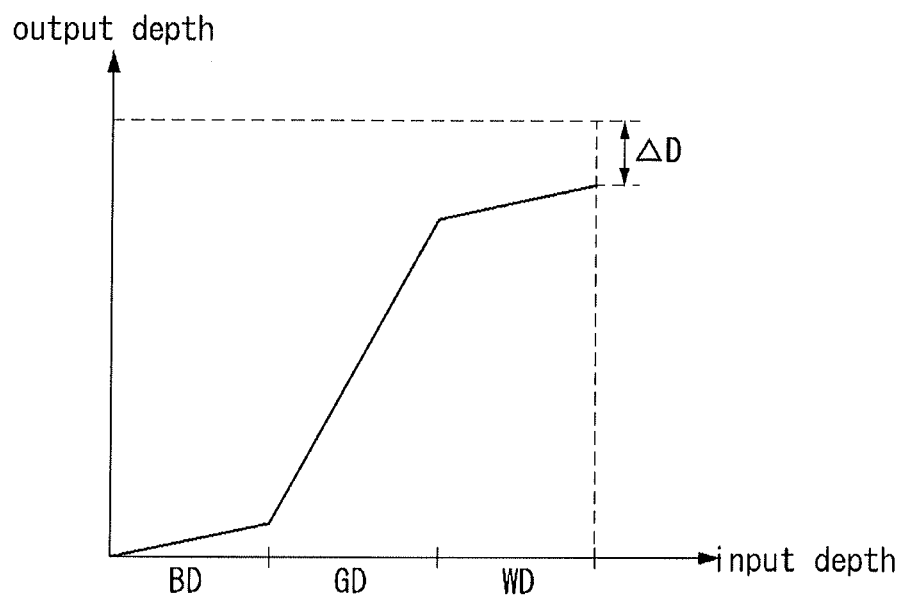
Figure 7C:
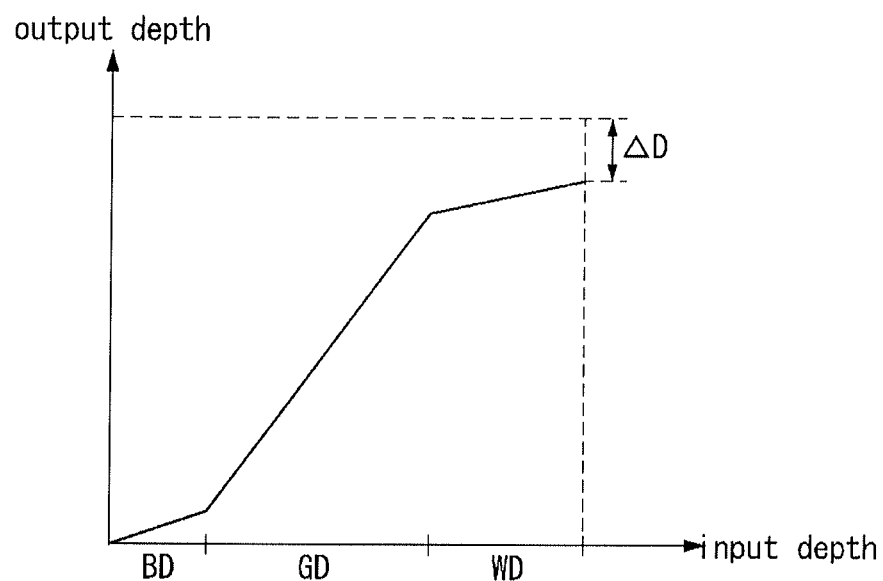
Figure 7D:
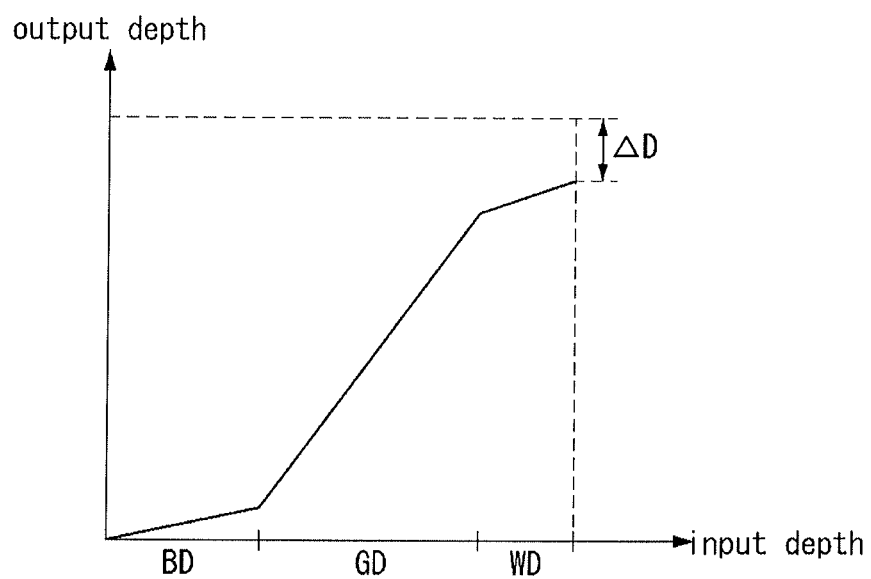
Figure 7E:
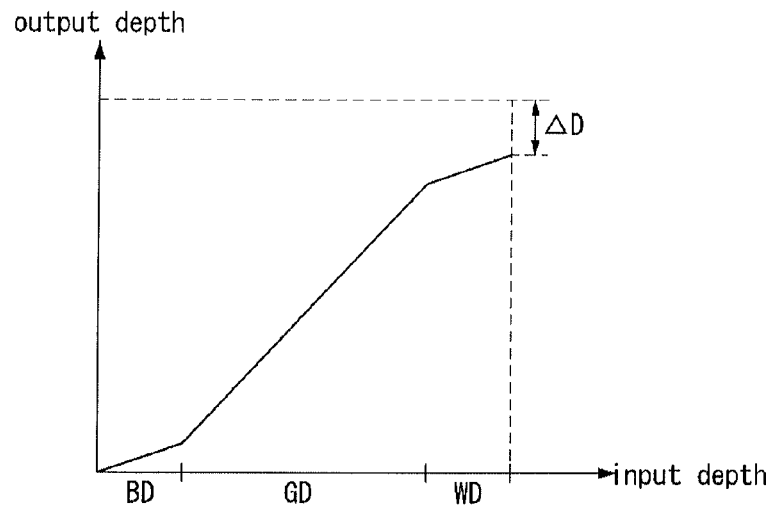

The depth modulation curve shown in FIGS. 7a to 7e comprise a first curved segment with a relatively small slope, a second curved segment with a relatively large slope, and a third curved segment with a relatively small slope. The second curved segment between the first curved segment and the third curved segment is connected to the endpoint of the first curved segment and the start point of the third curved segment. FIG. 7a shows a non-linear depth modulation curve which has a small slope in the first and second curved segments and a large slop in the second curved segment. FIGS. 7b to 7e show a segmented linear depth modulation curve which has a small slope in the first and second curve segments.

The first curved segment is a curve that connects crossing points between depth values (input depth values on the x-axis) in the black grayscale portion of the depth map of the original image and modulation values (output depth values on the y-axis) corresponding to the depth values. The second curved segment is a curve that connects crossing points between depth values (input depth values on the x-axis) in the gray grayscale portion of the depth map of the original image and modulation values (output depth values on the y-axis) corresponding to the depth values. The third curved segment is a curve that connects crossing points between depth values (input depth values on the x-axis) in the white grayscale portion of the depth map of the original image and modulation values (output depth values on the y-axis) corresponding to the depth values. In FIGS. 7a to 7e, "WD" denotes the input depth values in the white grayscale portion, "GD" denotes the input depth values in the gray grayscale portion, and "BD" denotes the input depth values in the black grayscale portion. The slope and length of each of the white grayscale portion WD, black grayscale portion BD, and gray grayscale portion GD may be fixed to values optimized based on the result of a fatigue test of the 3D image, or may be varied according to the program genre, properties, or average brightness of the 3D image, as shown in FIGS. 7b to 7e.

Figure 8:
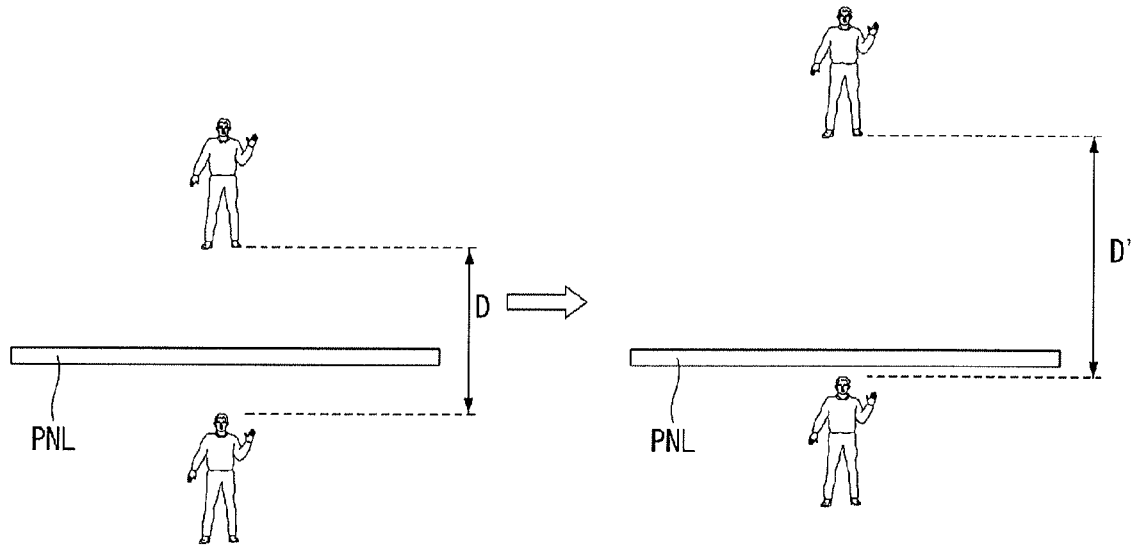
FIG. 8 is a view showing a depth modulation effect, which increases the difference of depth values between the foreground area and the background area.
Figure 9:
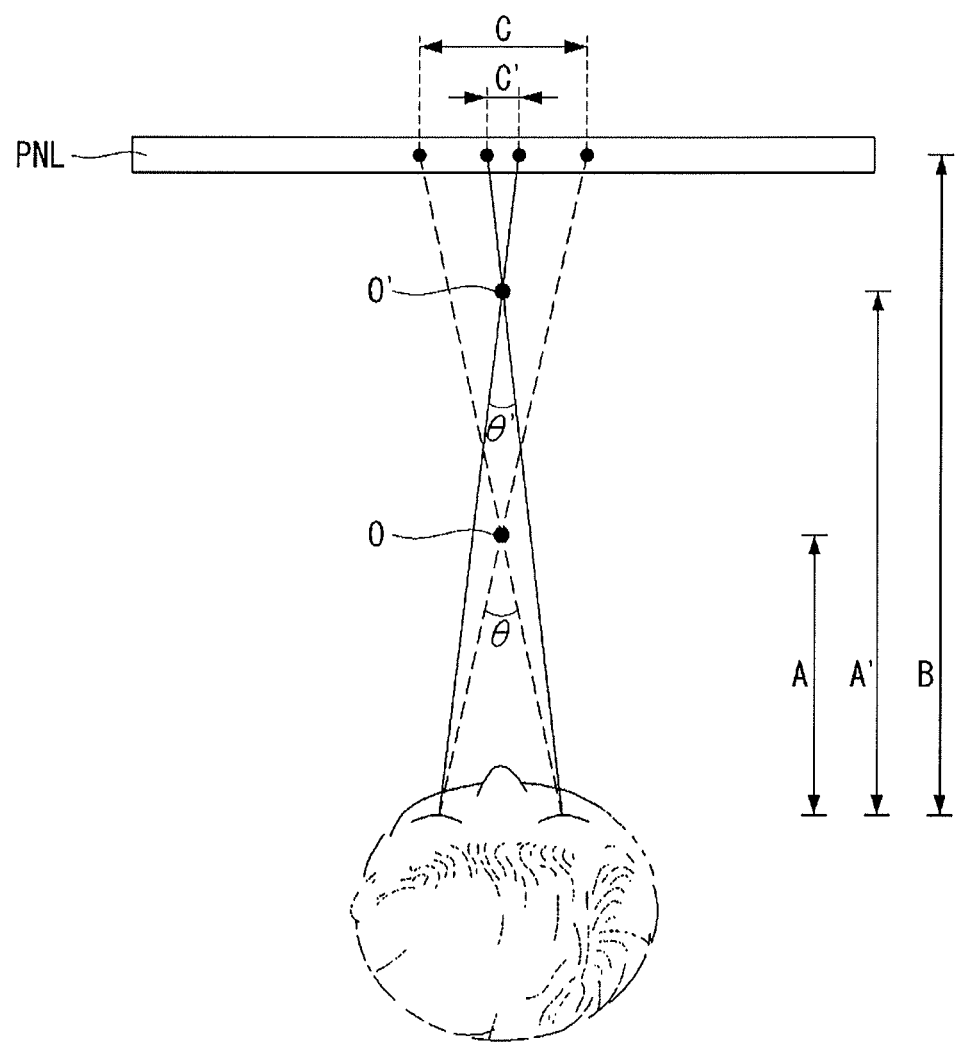
FIG. 9 is a view showing how the display position of a 3D image and the focal position of the viewer become similar to each other and how the convergence angle becomes smaller.

FIG. 8 is a view showing a depth modulation effect, which increases the difference of depth values between the foreground area and the background area. FIG. 9 is a view showing how the display position of a 3D image and the focal position of the viewer become similar to each other and how the convergence angle becomes smaller.

Referring to FIGS. 8 and 9, according to the depth modulation method of the present invention, the difference D' between depth values of the foreground area and the background area is modulated to be greater than an input value D, thereby giving a stronger sense of depth in the foreground area and the background area.

According to the depth modulation method of the present invention, the maximum depth value is decreased to increase the distance between images of objects (O,O') from A to A', thereby reducing the convergence angle to θ'. Moreover, according to the depth modulation method of the present invention, the maximum depth value is decreased to decrease the difference between the focal distance B of both eyes and the distance A' at which the image of the object is formed, and the distance between the left-eye image and the right-eye image at the focal position of both eyes is decreased from C to C'. As a result, according to the image data processing method of the present invention, viewer fatigue can be reduced without losing the depth effect for 3D images in the stereoscopic image display.

Figure 10:
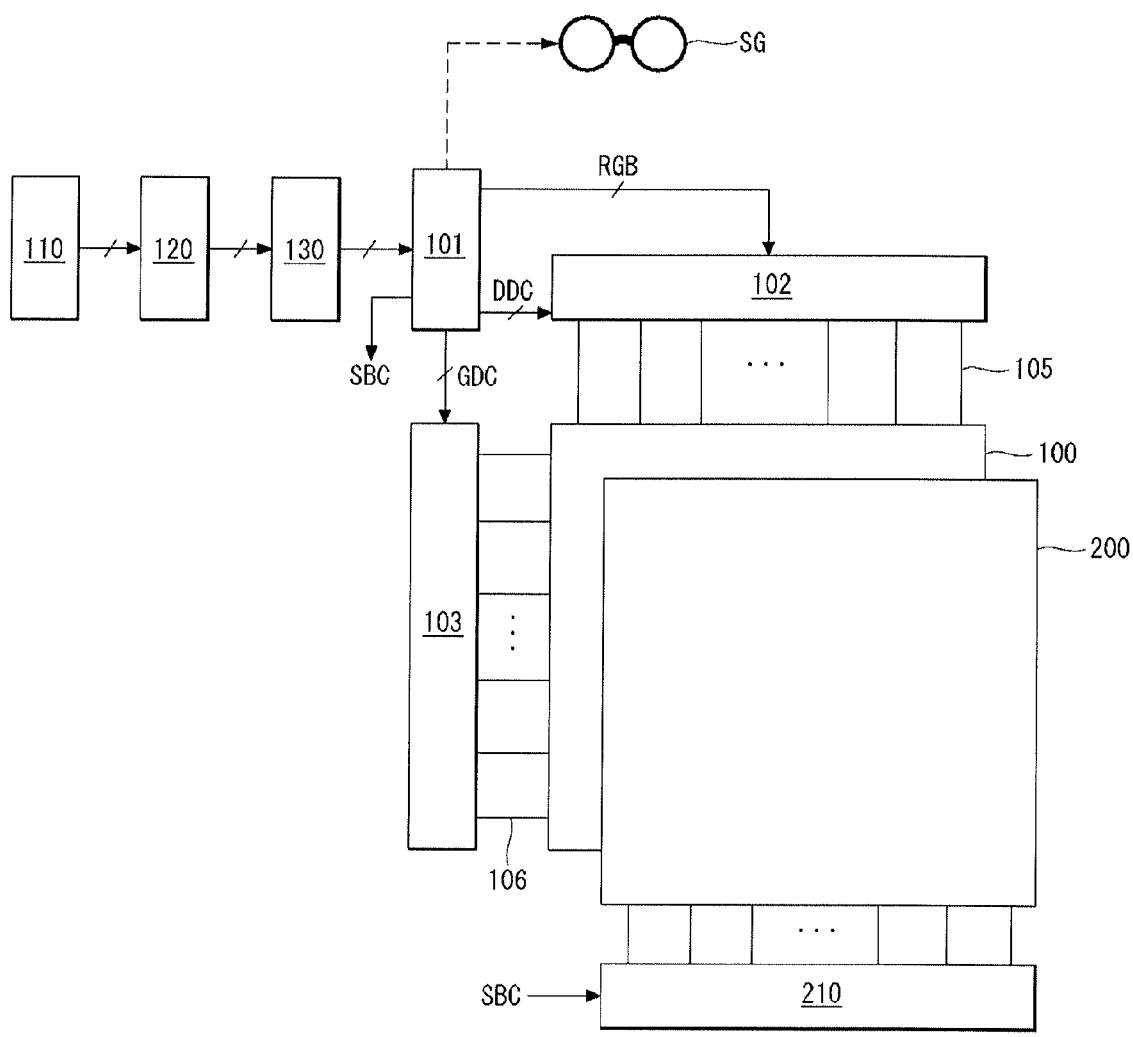
FIG. 10 is a block diagram showing a display panel driver and a 3D filter driver in a stereoscopic image display according to an exemplary embodiment of the present invention.
Figure 14:
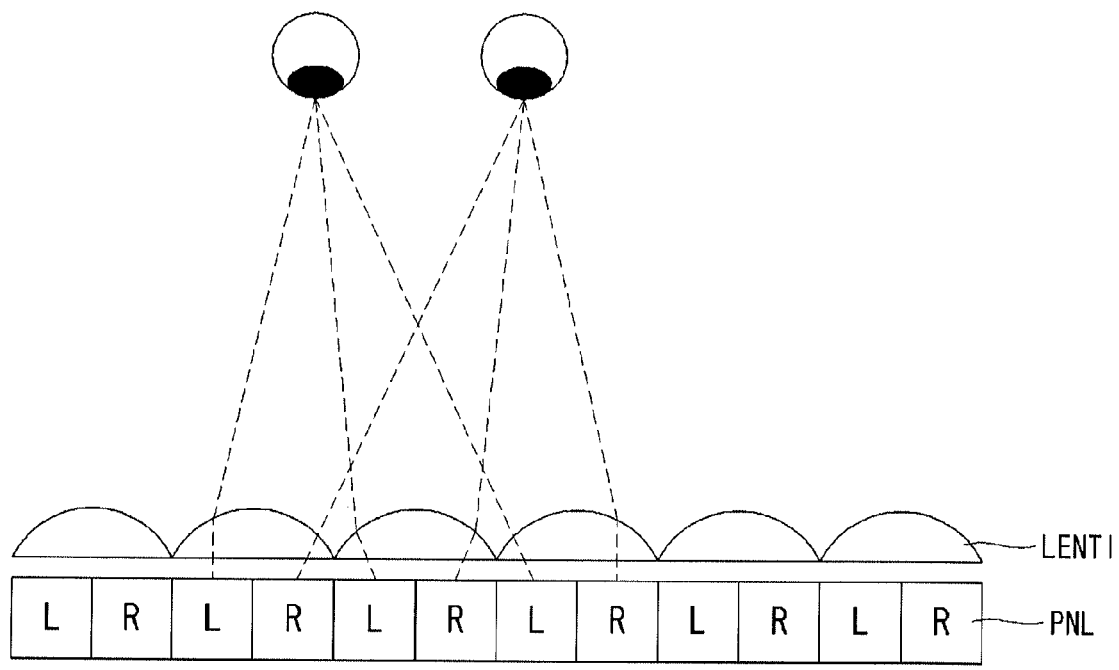
FIG. 14 is a cross-sectional view showing a lenticular lens film or a switchable lens.
Figure 15:
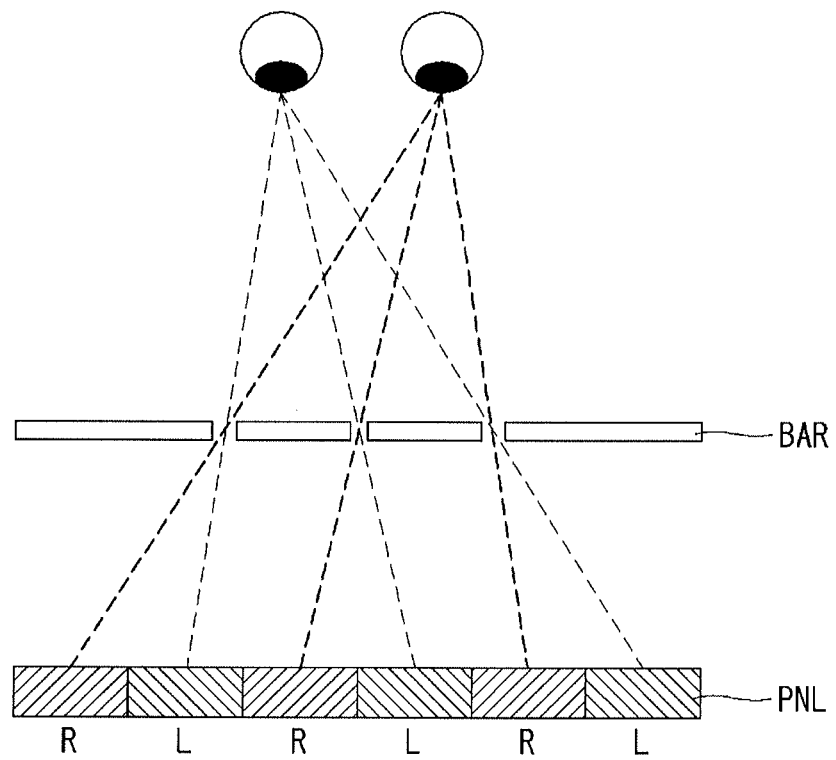
FIG. 15 is a cross-sectional view showing a parallax barrier or a switchable barrier.
Figure 16:
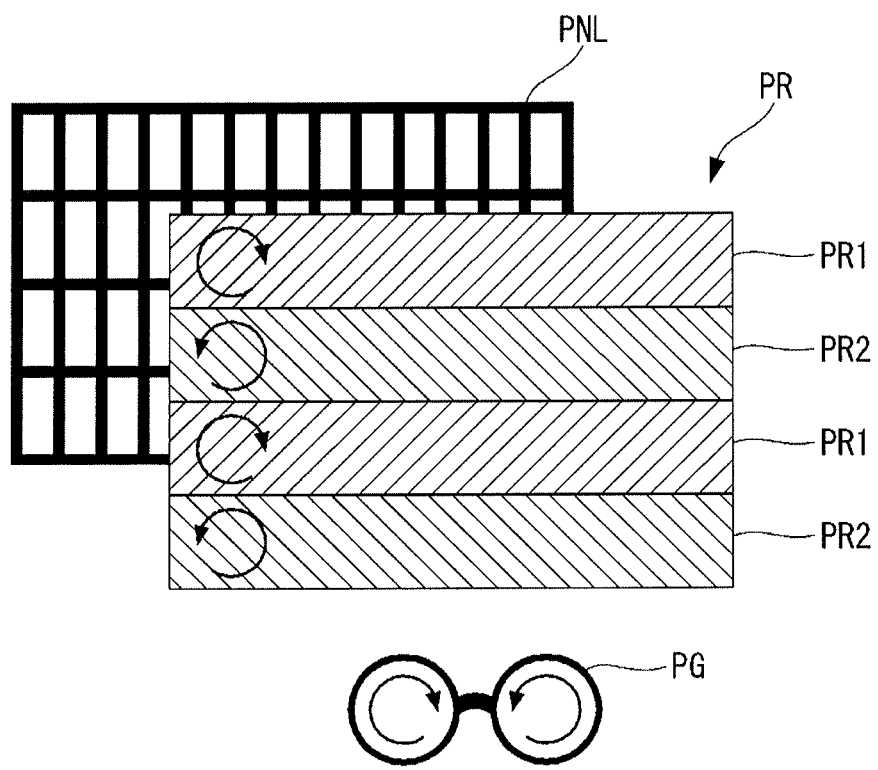
FIG. 16 is a view showing a polarization glasses type stereoscopic image display.
Figure 17:
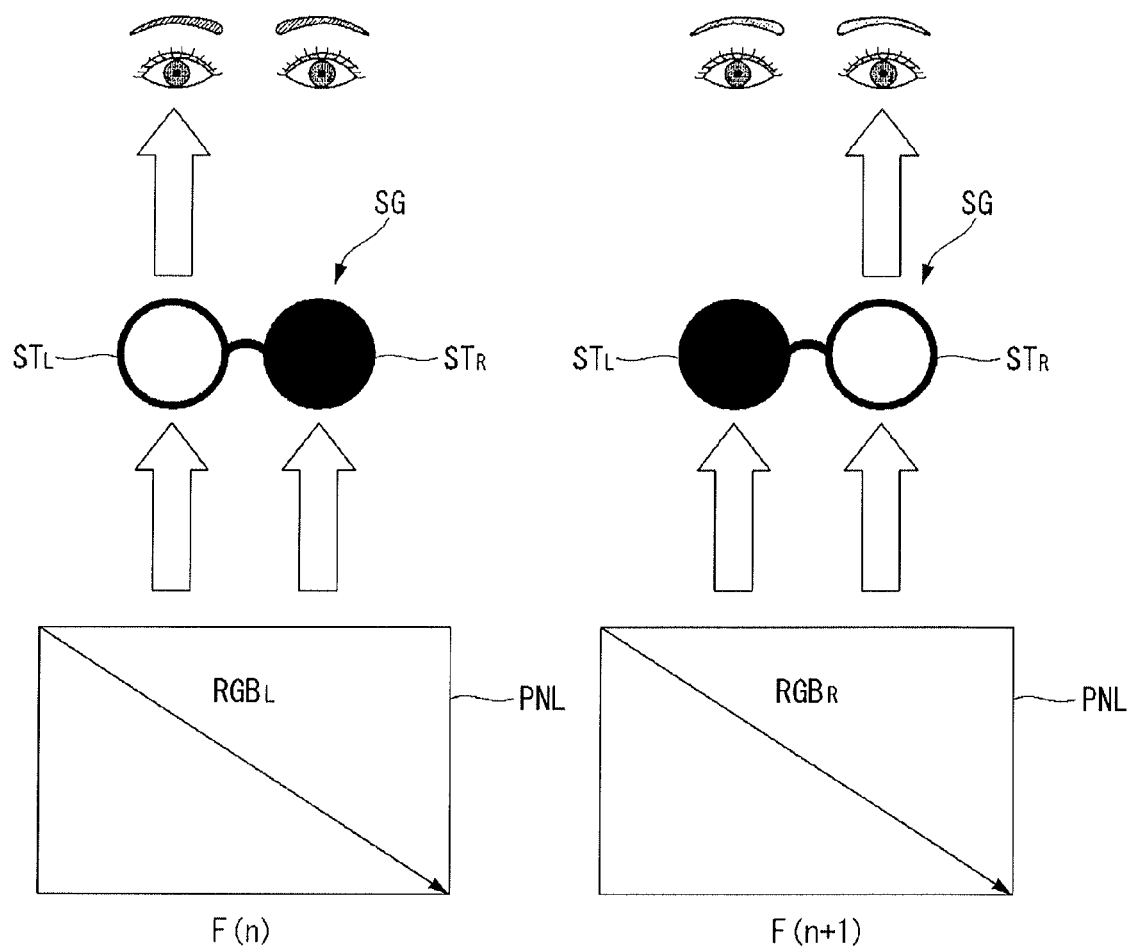
FIG. 17 is a view showing a shutter glasses type stereoscopic image display.

FIG. 10 is a block diagram showing a display panel driver and a 3D filter driver in a stereoscopic image display according to an exemplary embodiment of the present invention. FIG. 14 is a cross-sectional view showing a lenticular lens film or a switchable lens. FIG. 15 is a cross-sectional view showing a parallax barrier or a switchable barrier. FIG. 16 is a view showing a polarization glasses type stereoscopic image display. FIG. 17 is a view showing a shutter glasses type stereoscopic image display.

The stereoscopic image display of the present invention may be implemented as the non-glasses type stereoscopic image display device shown in FIGS. 14 and 15 or the glasses type stereoscopic image display shown in FIGS. 16 and 17.

Referring to FIG. 10, the stereoscopic image display of the present invention comprises a display panel 100, a 3D filter 200 bonded onto the display panel 100, a display panel driver, a 3D filter driver 210, a timing controller 101, and a 3D image data processor 130.

The display panel 10 comprises a pixel array in which data lines 105 and scan lines (or gate lines) 106 cross each other and pixels are disposed in a matrix form. The pixel array displays a 2D image in the 2D mode and displays a left-eye image and a right-eye image in the 3D mode.

The 3D filter 200 may be implemented as any of the following: a lenticular lens or switchable lens LENTI as shown in FIG. 14, a parallax barrier or switchable barrier BAR as shown in FIG. 15, and a patterned retarder PR or active retarder as shown in FIG. 16. If the 3D filter 00 is implemented as the patterned retarder PR, the viewer has to put on polarization glasses PG to view 3D image, as shown in FIG. 16. The switchable lens LENTI and the switchable barrier BAR comprises a birefringerant medium such as liquid crystal, and is electrically driven by the 3D filter driver 210 to separate the path of light emitted from left-eye sub-pixels and the path of light emitted from right-eye sub-pixels. The active retarder comprises a refrigerant medium such as liquid crystal, and is electrically driven by the 3D filter driver 210 to modulate the left-eye and right-eye images time-divided by frames to have different polarization characteristics. If the 3D filter 200 is implemented as an optical part, for example, a parallax barrier, a lenticular lens film, and a patterned retarder PR, which cannot be electrically controlled, the 3D filter driver 210 is not required.

The display panel driver comprises a data driving circuit 102 for supplying data voltages of 2D and 3D images to the data lines 105 of the display panel 100 and a scan driving circuit 103 for sequentially supplying scan pulses (or gate pulses) to the scan lines 106 of the display panel 100.

The data driving circuit 102 converts digital video data input from the timing controller 101 into an analog gamma voltage to generate data voltages, and supplies the data voltages to the data lines 105 of the display panel 100. In the case of a liquid crystal display device, the data driving circuit 102 can invert the polarity of the data voltages supplied to the data lines 105 under control of the timing controller 101. The scan driving circuit 103 supplies the scan pulses synchronized with the data voltages supplied to the data lines 105 to the scan lines 106 under control of the timing controller 101, and sequentially shifts the scan pulses.

The 3D filter driver 210 is driven in the 3D mode under control of the timing controller 101. The 3D filter driver 210 drives the switchable lens LENTI, switchable barrier BAR, or active retarder, in synchronization with 3D image data written in the pixel array of the display panel 100.

The timing controller 101 supplies digital video data RGB of a 2D/3D input image input from a host system 110 to the data driving circuit 102. Also, the timing controller 101 receives timing signals such as a vertical synchronization signal, a horizontal synchronization signal, a data enable signal, and a main clock, input from the host system 110 in synchronization with the digital video data of the 2D/3D input image, and generates timing control signals DDC, GDC, and SBC for controlling operation timings of the display panel driver 102 and 103 and the 3D filter driver 210 by using the timing signals and controlling the operation timings of these drivers to be synchronized with each other.

The timing controller 101 can control the operating frequency of the display panel driver 102 and 103 and the 3D filter driver 210 at a frame rate obtained by multiplying the frame frequency of an input image by N Hz (n is a positive integer equal to or greater than 2). The frame frequency of the input image is 60 Hz for NTSC (National Television Standards Committee) and 50 Hz for PAL (Phase-Alternating Line).

A 3D data aligner 120 may be installed between the host system 110 and the 3D image data processor 130. The 3D data aligner 120 realigns left-eye image data and right-eye image data of a 3D image input from the host system 110 in the 3D mode in accordance with a stereoscopic image display method, and supplies it to the 3D image data processor 130. When 2D image data is input in the 3D mode, the 3D data aligner 120 may execute a preset 2D-3D image conversion algorithm to generate left-eye image data and right-eye image data from the 2D image data and supply the data to the 3D image data processor 130.

Figure 11:
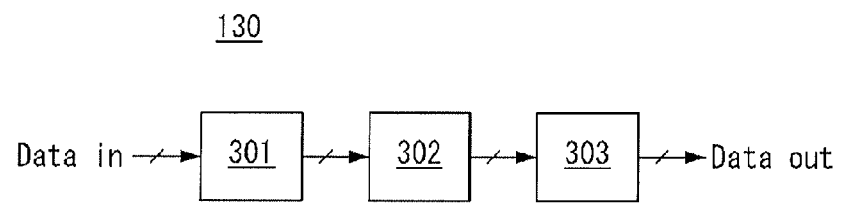
FIG. 11 is a block diagram showing a first exemplary embodiment of a 3D image data processor shown in FIG. 10.
Figure 12:
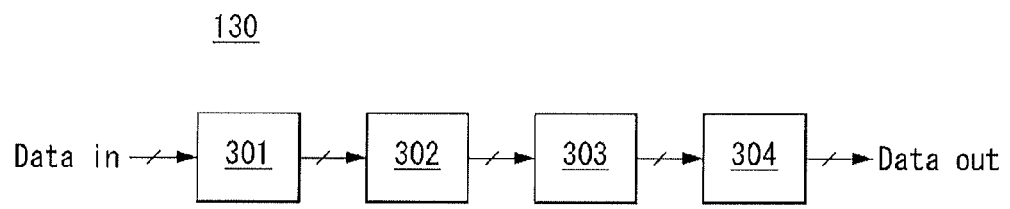
FIG. 12 is a block diagram showing a second exemplary embodiment of the 3D image data processor shown in FIG. 10
Figure 13:
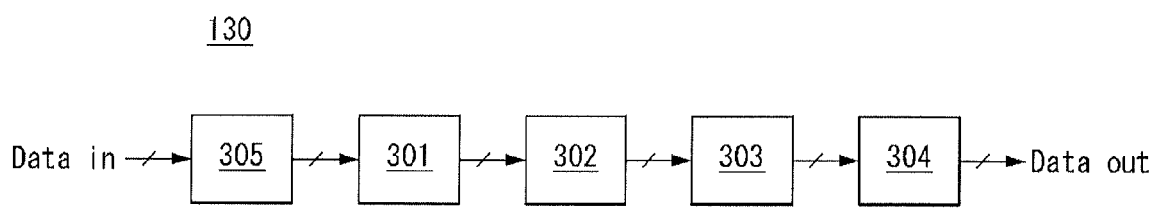
FIG. 13 is a block diagram showing a third exemplary embodiment of the 3D image data processor shown in FIG. 10

The 3D image data processor 130 executes the image data processing method shown in FIGS. 2 to 4 in the 3D mode to supply the timing controller 101 with the left-eye image data and right-eye image data of the 3D image having modulated depth information. To implement the image data processing method shown in FIG. 2, as shown in FIG. 11, the 3D image data processor 130 comprises a depth map extractor 301 for extracting a depth map from 3D image data, an image separator 302 for separating an input image into a foreground area and a background area based on grayscales of the depth map, and a depth modulator 303 for modulating a depth value of the input image. As shown in FIGS. 7a to 7e, the depth modulator 303 modulates the maximum depth value to be less than the maximum depth value of the input image, and modulates the difference between depth values in the gray grayscale portion to be greater than the difference between depth values of the foreground and background areas of the input image. To implement the image data processing method shown in FIGS. 3 and 4, as show in FIGS. 12 and 13, the 3D image data processor 130 may further comprise: an image analyzer 305 for analyzing 3D image data to determine whether the 3D image data is moving image data or still image data; and a sharpness adjuster 304 for, if the 3D image data is moving image data, for increasing sharpness by accentuating the sharpness of data in the foreground area or decreasing sharpness by blurring data in the background area. The sharpness adjuster 304 may use a well-known sharpening filter as means for increasing sharpness by sharpness accentuation and a well-known smoothing filter as means for decreasing sharpness by blurring. An example of the sharpening filter includes a Laplacian filter. Examples of the smoothing filter include an averaging filter, a low-pass filter, and an intermediate value filter.

The host system 110 may be implemented as any of the following: a navigation system, a set-top box, a DVD player, a Blue-ray player, a personal computer (PC), a home theater system, a broadcast receiver, and a phone system. The host system 110 uses a scaler to convert digital video data of a 2D/3D input image into a format appropriate for the resolution of the display panel PNL 100 and transmit a timing signal, along with the data, to the timing controller 101.

The host system 110 supplies a 2D image to the timing controller 101 in the 2D mode, and supplies a 3D or 2D image data to the 3D data aligner 120 in the 3D mode. The host system 110 may transmit a mode signal to the timing controller in response to user data input through a user interface (not shown) to enable switching between a 2D mode operation and a 3D mode operation. The user interface may be implemented as a keypad, a keyboard, a mouse, an on-screen display (OSD), a remote controller, a graphic user interface (GUI), a touch user interface (UI), a touch screen, a voice recognition UE, or a 3D UI. The user may select between the 2D mode and the 3D mode through the user interface, and select 2D-3D image conversion in the 3D mode.

Meanwhile, the shutter glasses type stereoscopic image display requires shutter glasses SG that are turned on/off in synchronization with left-eye image data and right-eye image data written in the display panel 100. In this case, the host system 110 or the timing controller 101 may transmit a shutter control signal to the shutter glasses SG to electrically control the left-eye shutter and right-eye shutter of the shutter glasses through a wired/wireless interface and open or close them. In the shutter glasses type stereoscopic image display, the 3D filter 200 bonded onto the display panel 100 and the 3D filter driver 210 are not required.

In FIG. 16, the patterned retarder PR comprises a first retarder PR1 facing odd-numbered lines of the pixel array of the display panel PNL and a second retarder PR2 facing the even-numbered lines of the pixel array of the display panel PNL. The pixels for displaying a left-eye image are disposed in the odd-numbered lines of the pixel array, and the pixels for displaying a right-eye image are disposed in the even-numbered lines of the pixel array. A left-eye polarization filter of the polarization glasses PG allows only first polarized light among the light emitted from the pixels disposed in the odd-numbered lines of the pixel array to pass therethrough. A right-eye polarization filter of the polarization glasses PG allows only second polarized light among the light emitted from the pixels disposed in the even-numbered lines of the pixel array to pass therethrough. Accordingly, the viewer sees only the pixels displaying the left-eye image through the left-eye polarization filter and only the pixels displaying the right-eye image through the left-eye polarization filter, thereby feeling a stereoscopic effect through binocular disparity.

Left-eye image data RGBL is written in the display panel PNL of the shutter glasses type stereoscopic image display shown in FIG. 17 during an odd-numbered frame period F(n). A left-eye lens STL of the shutter glasses ST is electrically controlled to be opened during the odd-numbered frame period F(n), in synchronization with left-eye image data RGBL displayed on the display panel PNL, and closed during an even-numbered frame period F(n+1). Right-eye image data RGBR is written in the display panel PNL during the even-numbered frame period F(n+1). A right-eye lens STR of the shutter glasses ST is electrically controlled to be opened during the even-numbered frame period F(n+1), in synchronization with right-eye image data RGBR displayed on the display panel PNL, and closed during the odd-numbered frame period F(n).

As discussed above, in the present invention, a 3D image is separated into a foreground area and a background area, the maximum depth value of the 3D image is decreased to be less than an input value, and the difference in depth between the foreground area and the background area is increased. As a result, the present invention can reduce viewer fatigue and keep a sense of depth by making the display position of the 3D image and the focal position of the viewer similar to each other and decreasing the convergence angle.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image data processing method comprising at least an image processor, performing:
   extracting a depth map from an input image, wherein the input image is comprised by a plurality of pixel data each with a corresponding depth value represented by a grayscale;
   using the plurality of pixel data which comprise the input image, mapping in a 1:1 linear correspondence, the input image to an output image to generate an initial depth map with an origin being a common starting minimum depth value, wherein each of the plurality of pixel data having the corresponding depth value represented by the grayscale, and the initial depth map comprises an x-axis corresponding to the depth values represented by the grayscale of the input image, and a y-axis corresponding to depth values represented by the grayscale of the output image;
   separating along the x-axis of the input image in the initial depth map, into a foreground area, a background area and a gray grayscale portion corresponding to the depth values between the foreground area and the background area based on the represented grayscales of the initial depth map;
   modulating by changing a grayscale of only a maximum depth value of the input image without changing the common starting minimum depth value at the origin to produce a modified output image for a modified depth map, wherein the modified output image corresponds to a lower maximum depth value represented by the grayscale in the modified depth map;
   modulating along the x-axis of the modified depth map, respective depth values represented by the grayscale in the foreground area, the background area and the gray grayscale portion of the input image to produce corresponding depth values represented by the grayscale for a final output image of a final depth map, such that in the final output image: changes to the depth values represented by the grayscale along the y-axis corresponding to the gray grayscale portion of the input image, being faster than changes to the depth values represented by the grayscale along the y-axis corresponding to both the foreground area and the background area of the input image on the final depth map, respectively, wherein the output image corresponds to a same lower maximum depth value without changing the common starting minimum depth value at the origin; and
   displaying the final modified output image as the stereoscopic image according to the final depth map.

2. The method of claim 1, wherein the depth values of the foreground area are depth values of the image corresponding to a white grayscale portion of the depth map, and
   the depth values of the background area are depth values of the image corresponding to a black grayscale portion of the depth map,
   wherein the gray grayscale portion comprises depth values of the image which consist of grayscale values between the white grayscale portion and the black grayscale portion.

3. The method of claim 1, further comprising accentuating a sharpness of pixel data of the foreground image to increase the sharpness of the foreground image, or blurring pixel data of the background image to decrease the sharpness of the background image.

4. The method of claim 1, further comprising:
   analyzing the input image to determine whether the input image is a moving image or still image;
   if the input image is a moving image, accentuating a sharpness of pixel data of the foreground image to increase the sharpness of the foreground image, or blurring pixel data of the background image to decrease the sharpness of the background image; and
   if the input image is a still image, maintaining depth information of the input image as input depth values.

5. The method of claim 1, wherein, in the modulating of the maximum depth value of the input image to take on the smaller depth value and the difference between depth values of a gray grayscale portion of the depth map to be greater than the difference between the depth values of the foreground area and the background area of the input image,
   the depth values are modulated based on a depth modulation curve divided into a first curved segment for modulating the depth values of the foreground area, a second curved segment for modulating the depth values of the gray grayscale portion, and a third curved segment for modulating the depth values of the background area,
   the depth modulation curve has a different slope for each segment between the x-axis on which input depth values are defined and the y-axis on which output depth values are defined, and
   the slope of the second curved segment is greater than the slope of each of the first and the third curved segments.

6. The method of claim 5, wherein, in the modulating of the maximum depth value of the input image to take on the smaller depth value, and the difference between depth values of a gray grayscale segment of the depth map to be greater than the difference between depth values of the foreground area and background area of the input image,
   the depth values are multiplied by a weighted value proportional to the slope of the curve.

7. The method of claim 1, wherein, in the modulating of the maximum depth value of the input image to take on the smaller depth value, and the difference between depth values of a gray grayscale segment of the depth map to be greater than the difference between depth values of the foreground area and background area of the input image,
   the depth values are modulated based on a look-up table which stores a depth modulation curve divided into a first curved segment for modulating the depth values of the foreground area, a second curved segment for modulating the depth values of the gray grayscale portion, and a third curved segment for modulating the depth values of the background area,
   the depth modulation curve has a different slope for each segment between the x-axis on which input depth values are defined and the y-axis on which output depth values are defined, and
   the slope of the second curved segment is greater than the slope of each of the first and third curved segments.

8. A stereoscopic image display comprising at least a processor which executes algorithms stored in a memory which configure the stereoscopic image display to:
   extract a depth map from an input image, wherein the input image is comprised by a plurality of pixel data each with a corresponding depth value represented by a grayscale;
   use the plurality of pixel data which comprise the input image, mapping in a 1:1 linear correspondence, the input image to an output image to generate an initial depth map with an origin being a common starting minimum depth value, wherein each of the plurality of pixel data having the corresponding depth value represented by the grayscale, and the initial depth map comprises an x-axis corresponding to the depth values represented by the grayscale of the input image, and a y-axis corresponding to depth values represented by the grayscale of the output image;

separate along the x-axis of the input image in the initial depth map, into a foreground area, a background area and a gray grayscale portion corresponding to the depth values between the foreground area and the background area based on the represented grayscales of the initial depth map;

modulate by changing a grayscale of only a maximum depth value of the input image without changing the common starting minimum depth value at the origin to produce a modified output image for a modified depth map, wherein the modified output image corresponds to a lower maximum depth value represented by the grayscale in the modified depth map;

modulate along the x-axis of the modified depth map, respective depth values represented by the grayscale in the foreground area, the background area and the gray grayscale portion of the input image to produce corresponding depth values represented by the grayscale for a final output image of a final depth map, such that in the final output image: changes to the depth values represented by the grayscale along the y-axis corresponding to the gray grayscale portion of the input image, being faster than changes to the depth values represented by the grayscale along the y-axis corresponding to both the foreground area and the background area of the input image on the final depth map, respectively, wherein the output image corresponds to a same lower maximum depth value without changing the common starting minimum depth value at the origin; and display the final modified output image as the stereoscopic image according to the final depth map.

9. The stereoscopic image display of claim 8, wherein the depth values of the foreground area are depth values of the image corresponding to a white grayscale portion of the depth map, and the depth values of the background area are depth values of the image corresponding to a black grayscale portion of the depth map, wherein the gray grayscale portion comprises depth values of the image which consist of grayscale values between the white grayscale portion and the black grayscale portion.

10. The stereoscopic image display of claim 8, further configured to: accentuate a sharpness of pixel data of the foreground image to increase the sharpness of the foreground image, or blur pixel data of the background image to decrease the sharpness of the background image.

11. The stereoscopic image display of claim 8, further configured to:

analyze the input image to determine whether the input image is a moving image or still image;

if the input image is a moving image, accentuate a sharpness of pixel data of the foreground image to increase the sharpness of the foreground image, or blur pixel data of the background image to decrease the sharpness of the background image, wherein if the input image is a still image, depth information of the input image is maintained as input depth values.

12. The stereoscopic image display of claim 8, is further configured to modulate the depth values based on a depth modulation curve divided into a first curved segment for modulating the depth values of the foreground area, a second curved segment for modulating the depth values of the gray grayscale portion, and a third curved segment for modulating the depth values of the background area, wherein:

the depth modulation curve has a different slope for each segment between the x-axis on which input depth values are defined and the y-axis on which output depth values are defined, and the slope of the second curved segment is greater than the slope of each of the first and third curved segments.

13. The stereoscopic image display of claim 12, is further configured to multiply the depth values by a weighted value proportional to the slope of the curve.

14. The stereoscopic image display of claim 8, is further configured to modulate the depth values based on a look-up table which stores a depth modulation curve divided into a first curved segment for modulating the depth values of the foreground area, a second curved segment for modulating the depth values of only the gray grayscale portion, and a third curved segment for modulating the depth values of the background area, wherein:

the depth modulation curve has a different slope for each segment between the x-axis on which input depth values are defined and the y-axis on which output depth values are defined, and the slope of the second curved segment is greater than the slope of each of the first and third curved segments.

* * * * *